United States Patent
Shoda et al.

(10) Patent No.: US 9,030,596 B2
(45) Date of Patent: May 12, 2015

(54) FOCUS DETECTION APPARATUS AND IMAGE PICKUP APPARATUS THAT PERFORM FOCUS DETECTION USING PHASE DIFFERENCE METHOD

(71) Applicant: Canon Kabushiki Kaisha, Tokyo (JP)

(72) Inventors: Satoshi Shoda, Utsunomiya (JP); Takeshi Ogawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/887,499

(22) Filed: May 6, 2013

(65) Prior Publication Data

US 2013/0293763 A1    Nov. 7, 2013

(30) Foreign Application Priority Data

May 7, 2012    (JP) ................................ 2012-105990

(51) Int. Cl.
| | |
|---|---|
| G03B 13/00 | (2006.01) |
| H04N 5/232 | (2006.01) |
| H04N 5/228 | (2006.01) |
| H04N 9/083 | (2006.01) |
| H04N 3/14 | (2006.01) |
| H04N 5/335 | (2011.01) |
| H04N 9/04 | (2006.01) |
| H04N 5/235 | (2006.01) |

(52) U.S. Cl.
CPC ........... *H04N 5/23212* (2013.01); *H04N 5/235* (2013.01)

(58) Field of Classification Search
USPC ....................................................... 250/208.1
See application file for complete search history.

(56) References Cited

U.S. PATENT DOCUMENTS

| | | | |
|---|---|---|---|
| 2005/0249404 A1* | 11/2005 | Xiaomang ..................... 382/162 |
| 2009/0073282 A1* | 3/2009 | Yamada et al. ............ 348/223.1 |
| 2009/0309999 A1* | 12/2009 | Hirai et al. .................... 348/241 |
| 2010/0182478 A1* | 7/2010 | Sawada ......................... 348/311 |
| 2010/0188532 A1* | 7/2010 | Kusaka et al. ........... 348/240.99 |
| 2010/0208097 A1* | 8/2010 | Tanabe ....................... 348/223.1 |
| 2010/0246967 A1* | 9/2010 | Ando et al. ................... 382/190 |
| 2011/0085062 A1* | 4/2011 | Rhodes ......................... 348/279 |
| 2011/0134292 A1* | 6/2011 | Hirai ............................. 348/280 |
| 2012/0268627 A1* | 10/2012 | Oike ............................. 348/241 |
| 2012/0300104 A1* | 11/2012 | Onuki et al. ................. 348/302 |
| 2013/0002911 A1* | 1/2013 | Miyashita et al. ............ 348/247 |
| 2013/0193311 A1* | 8/2013 | Yoshida ..................... 250/208.1 |
| 2013/0215288 A1* | 8/2013 | Takeuchi .................... 348/223.1 |
| 2014/0146196 A1* | 5/2014 | Shoda et al. ............... 348/222.1 |
| 2014/0146218 A1* | 5/2014 | Kunieda et al. .............. 348/345 |
| 2014/0146220 A1* | 5/2014 | Takeuchi ...................... 348/353 |

FOREIGN PATENT DOCUMENTS

| | | |
|---|---|---|
| JP | 2001-083407 A | 3/2001 |
| JP | 4691930 A | 6/2011 |

* cited by examiner

*Primary Examiner* — Michael Osinski
(74) *Attorney, Agent, or Firm* — Rossi, Kimms & McDowell LLP

(57) ABSTRACT

A focus detection apparatus which is capable of estimating each of signals from a plurality of split PDs, which are included in a sum signal from split PDs, by performing a computation to thus detect saturation with respect to each split PD. With respect to each unit pixel cell having a plurality of PDs sharing one micro lens, saturation of a pixel signal read out in a non-destructive manner from one of the PDs is detected. Based on a first luminance signal and a sum pixel signal obtained by summing signals output from the PDs, another pixel signal output from another one of the PDs is estimated. Saturation of the estimated pixel signal is detected, and a second luminance signal is generated. Based on the first and second luminance signals, the amount of defocus for an optical unit is calculated.

12 Claims, 15 Drawing Sheets

FRONT FOCUS ba ba ba ba ba ba ba ba ba   ba   ba   ba   ba
P1 P2 P3 P4 P5 P6 P7 P8 P9 P10 P11 P12 P13

α(c)

|d(c)|

—— A IMAGE PIXEL GROUP
----- B IMAGE PIXEL GROUP

FOCUS DETECTION APPARATUS AND IMAGE PICKUP APPARATUS THAT PERFORM FOCUS DETECTION USING PHASE DIFFERENCE METHOD

BACKGROUND OF THE INVENTION

1. Field of the Invention

The present invention relates to a focus detection apparatus and an image pickup apparatus that perform focus detection using a phase difference method by obtaining pupil-divided images using an image pickup device having a plurality of photoelectric converters sharing a micro lens, and in particular to a focus detection apparatus and an image pickup apparatus that detect saturation of photoelectric converters.

2. Description of the Related Art

As a focus detection method for an image pickup apparatus, there is known a technique that splits a photoelectric converter (hereafter referred to as "PD") constituting one pixel of a solid-state imaging device which corresponds to one micro lens into a plurality of PDs. For example, there has been proposed a method in which two PDs (hereafter referred to as "split PDs") sharing one micro lens obtains respective image signals obtained by pupil-dividing so as to carry out a focus detection process using a phase difference method, and in parallel with this, a sum of outputs from the two split PDs is handled as a one-pixel output to obtain an image signal for imaging (see Japanese Laid-Open Patent Publication (Kokai) No. 2001-83407.)

There has also been proposed a technique that, in order to improve sensitivity characteristics of the split pixel structure described above, reads out charge in one of the split PDs in a non-destructive manner, then reads out a sum of outputs from the two split PDs, and estimates a pixel value of the other one of the split PDs by performing a computation (see Japanese Patent Publication No. 4691930).

In the phase difference computation, a correlation computation result that is not dependent on a subject color can be obtained by performing a computation using a luminance signal. Moreover, using a technique described in Japanese Patent Publication No. 4691930 can improve sensitivity characteristics.

However, according to the technique described in Japanese Patent Publication No. 4691930, because a difference value is calculated by reading sums of outputs from all split PDs after reading out some of split PDs in a non-destructive manner, delay means for providing timing of output signals between split pixels that have been read out is required. On this occasion, providing delay means for respective colors will bring about an increase in circuit size. In one of methods to circumvent this problem, a signal from each PD is converted into a luminance component signal in advance and then input to delay means, and this is thought to save delay means and improve focus detection accuracy.

Incidentally, there is known a characteristic that when saturation occurs in a split PD described in Japanese Laid-Open Patent Publication (Kokai) No. 2001-83407 and Japanese Patent Publication No. 4691930, charge corresponding to the amount of saturation may leak into an adjacent split PD. Because of this characteristic, a signal of a split PD lying under the same micro lens as a split PD in which saturation is occurring causes a phase-contrast image to collapse due to leakage of charge resulting from saturation.

To circumvent this problem, it is desired that saturation is detected with respect to each split PD before a focus detection process, and the focus detection process with consideration given to saturation is carried out. In this case, however, when the above described arrangement in which a signal of each split PD is converted into a luminance component signal in advance is used, a luminance component signal is calculated through computations among other luminance component signals, and it is thus difficult to know an original output signal of each split PD corresponding to the calculated luminance component signal.

SUMMARY OF THE INVENTION

The present invention provides a focus detection apparatus and an image pickup apparatus that are capable of estimating each of signals from a plurality of split PDs, which are included in a sum signal from split PDs, by performing a computation to thus detect saturation with respect to each split PD.

Accordingly, a first aspect of the present invention provides a focus detection apparatus comprising a solid-state imaging device configured to have an array of a plurality of unit pixel cells each having a plurality of photoelectric converters sharing one micro lens, a first saturation detection unit configured to, with respect to each of the unit pixel cells, detect saturation of a pixel signal read out in a non-destructive manner from one of the plurality of photoelectric converters, a first luminance signal generation unit configured to generate a first luminance signal from a first output signal from the first saturation detection unit, an estimation unit configured to, based on the first luminance signal and a sum pixel signal obtained by summing and reading out signals from the plurality of photoelectric converters, estimate another pixel signal output from another one of the plurality of photoelectric converters, a second saturation detection unit configured to detect saturation of the other pixel signal estimated by the estimation unit, a second luminance signal generation unit configured to generate a second luminance signal from a second output signal from the second saturation detection unit, and a focus detection processing unit configured to, based on the first luminance signal and the second luminance signal, calculate an amount of defocus for an optical system provided for the solid-state imaging device.

Accordingly, a second aspect of the present invention provides an image pickup apparatus comprising a focus detection apparatus configured to have a solid-state imaging device configured to have an array of a plurality of unit pixel cells each having a plurality of photoelectric converters sharing one micro lens, a first saturation detection unit configured to, with respect to each of the unit pixel cells, detect saturation of a pixel signal read out in a non-destructive manner from one of the plurality of photoelectric converters, a first luminance signal generation unit configured to generate a first luminance signal from a first output signal from the first saturation detection unit, an estimation unit configured to, based on the first luminance signal and a sum pixel signal obtained by summing and reading out signals from the plurality of photoelectric converters, estimate another pixel signal output from another one of the plurality of photoelectric converters, a second saturation detection unit configured to detect saturation of the other pixel signal estimated by the estimation unit, a second luminance signal generation unit configured to generate a second luminance signal from a second output signal from the second saturation detection unit, and a focus detection processing unit configured to, based on the first luminance signal and the second luminance signal, calculate an amount of defocus for an optical system provided for the solid-state imaging device, a group of lenses configured to form an optical image on the solid-state imaging device which the focus detection apparatus has, and a control unit configured to drivingly control the group of lenses based on the amount of defocus output from the focus detection processing unit which the focus detection apparatus has.

According to the present invention, each of signals from a plurality of split PDs, which are included in a sum signal from split PDs, is estimated by performing a computation to thus detect saturation with respect to each split PD, and this enables satisfactory focus detection.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
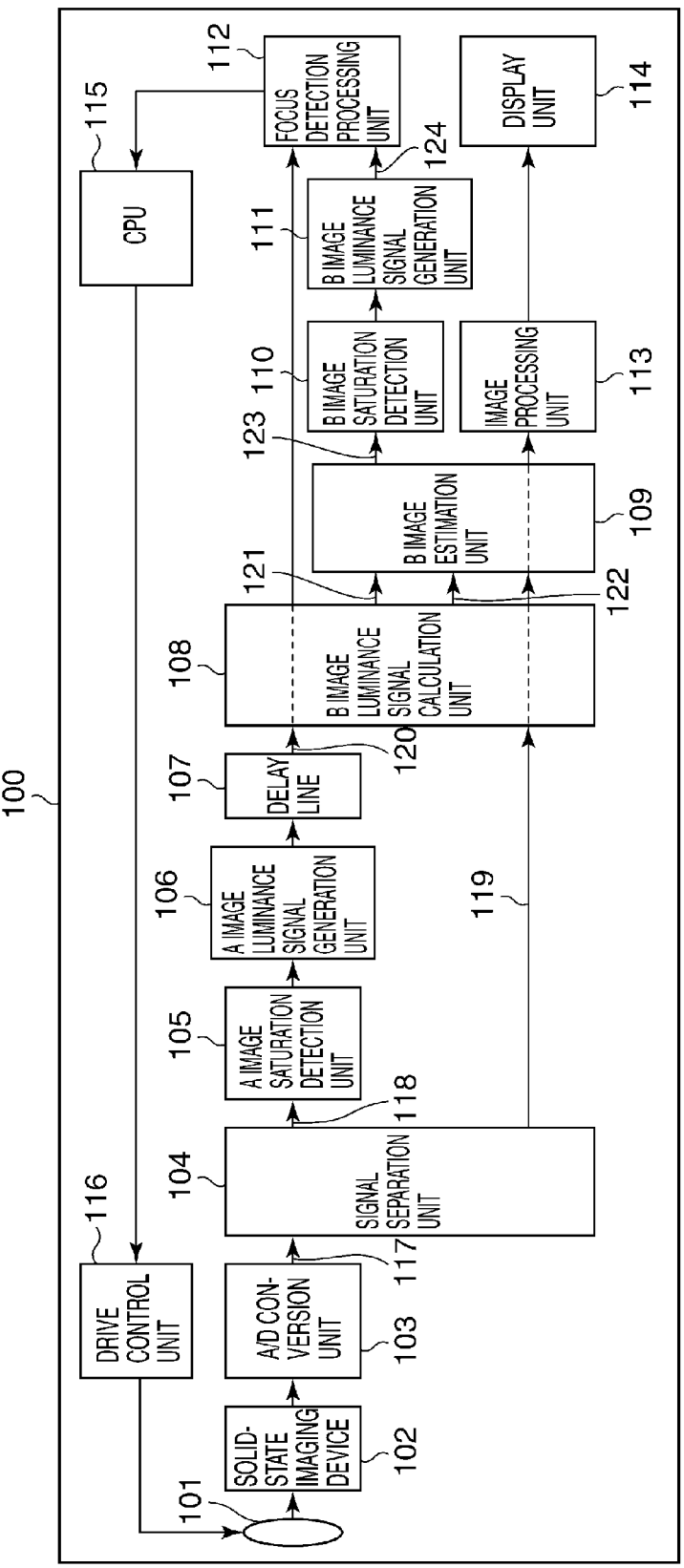
FIG. 1 is a block diagram schematically showing parts related mainly to a focus detection apparatus in an image pickup apparatus according to an embodiment of the present invention.

FIG. 1 is a block diagram schematically showing parts related mainly to a focus detection apparatus in an image pickup apparatus 100 according to a first embodiment of the present invention. The image pickup apparatus 100 has an optical unit 101 comprised of optical lenses including a focusing lens for adjusting focus, a shutter, a diaphragm, a lens controller, and so on, and the optical unit 101 is driven based on output from a drive control unit 116, to be described later. An optical image of a subject is formed on a surface of a solid-state imaging device 102 through the optical unit 101. The solid-state imaging device 102 has a two-dimensional matrix of unit pixel cells, to be described later, and the amount of light exposure to the solid-state imaging device 102 is controlled by the shutter which the optical unit 101 has.

Figure 2:
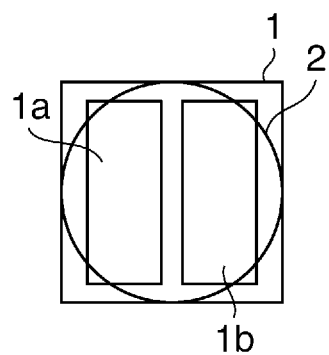
FIG. 2 is a plan view schematically showing a structure of a unit pixel cell constituting a solid-state imaging device appearing in FIG. 1.

Referring now to FIG. 2, a description will be given of a unit pixel cell in the solid-state imaging device 102. FIG. 2 is a plan view schematically showing a structure of a unit pixel cell constituting the solid-state imaging device 102. The unit pixel cell 1 constituting the solid-state imaging device 102 has an arrangement in which a color filter, not shown, is disposed under one micro lens 2, and split PDs 1a and 1b (two split photoelectric converters) are disposed under the color filter. The split PDs 1a and 1b capture incident light via the same micro lens 2 which they share. According to their locations, the split PDs 1a and 1b can be handled as an A image pixel and a B image pixel which are obtained by pupil dividing. The unit pixel cells 1 are repetitively placed in a Bayer array on the solid-state imaging device 102.

Accumulated charge can be read out and summed from split PDs 1a and 1b sharing the same micro lens 2, and also, accumulated charge can be read out selectively in a non-destructive manner from each of the split PDs 1a and 1b. In the present embodiment, first, non-destructive readout of A image pixel signals for one line in a horizontal direction from the solid-state imaging device 102, that is, non-destructive readout of split pixel signals from the split PDs 1a is performed. Subsequently, readout of a sum signal of A image pixels and B image pixels in the same line from the solid-state imaging device 102, that is, unit pixel signals from the split PDs 1a and 1b is performed. It should be noted that readout of these signals from the solid-state imaging device 102 is controlled by a CPU 115 appearing in FIG. 1.

An A/D conversion unit 103 converts an analog signal, which is a signal of charge output from the solid-state imaging device 102, into a digital signal (hereafter referred to as "the readout pixel signal 117") and outputs the readout pixel signal 117 to a signal separation unit 104. The signal separation unit 104 determines a type of the readout pixel signal 117. When an A image pixel is read out, the signal separation unit 104 outputs an A image signal 118 which is a pixel signal of the A image pixel to an A image saturation detection unit 105 which is a first saturation detection unit, and when an imaging pixel is read out, the signal separation unit 104 outputs an A+B image signal 119 which is a pixel signal of the imaging pixel to a B image luminance signal calculation unit 108.

The A image saturation detection unit 105 determines whether or not the A image signal 118 has reached a predetermined saturation level, adds a saturation bit to the A image signal 118, and then outputs the A image signal 118 to an A image luminance signal generation unit 106 which is a first luminance signal generation unit. At this time, when the input pixel has reached the saturation level, it is determined that the input pixel is a saturated pixel, and a saturation bit "1" is added to the MSB (most significant bit) or LSB (least significant bit) of the pixel signal. It should be noted that handling a part of a pixel signal as a saturation bit may replace addition of a saturation bit, and also, the polarity should not be limited.

Figure 3:
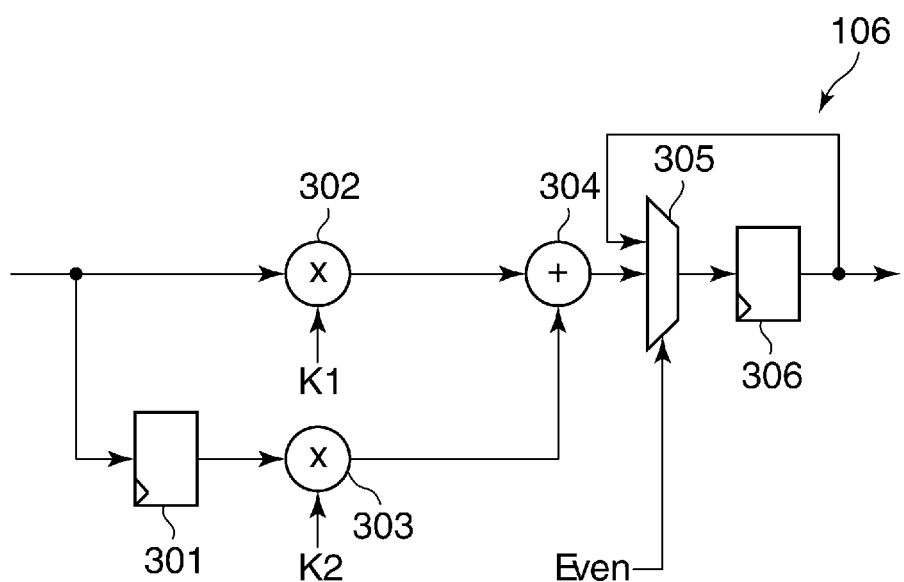
FIG. 3 is a block diagram schematically showing a circuit arrangement of an A image luminance signal generation unit appearing in FIG. 1.

The A image luminance signal generation unit 106 converts a received signal from the A image saturation detection unit 105 into a component signal of a luminance signal Y and outputs the component signal to a delay line 107. Referring now to a block diagram of FIG. 3 showing a circuit arrangement of the A image luminance signal generation unit 106, a description will be given of a circuit operation in a case where RA and GA constituting the first line in the horizontal direction are input. It should be noted that RA, GA, and BA, to be described later, designate respective split pixel signals, that is, A image pixel signals of red, green, and blue read out in a non-destructive manner from A image split PDs lying under micro lenses each having red, green, and blue color filters.

RA and GA are successively input in the horizontal direction to the A image luminance signal generation unit 106. One of RA and GA thus input is directly output to a multiplication unit 302, and the other one is output to a multiplication unit 303 via a flip-flop 301 which is for providing timing. The multiplication units 302 and 303 multiply RA and GA by predetermined coefficients K1 and K2 and output the results to an adding unit 304, which in turn sums them to generate a luminance component signal of an A image pixel, which is then output to the delay line 107 in a later stage.

At this time, the output from the adding unit 304 is input to a multiplexer 305.

Signals from the adding unit 304 and a register 306 in a later stage are input to the multiplexer 305. Also, the multiplexer 305 uses, as a selection control input signal, a signal (Even) that is output when a horizontal-direction pixel counter (not shown) indicates an even number, and based on the selection control input signal, selectively outputs one of input signals. When the Even signal is valid, the multiplexer 305 selects an output signal from the adding unit 304 and outputs the same, and when the Even signal is invalid, the multiplexer 305 selects an output signal from the register 306 and outputs the same. Thus, when the Even signal is valid, the value of the register 306 is updated, and when the Even signal is invalid, data is held by iteration of the value (updated immediately before) of the register 306.

It should be noted that only the operation in the case where pixels signals in the first line in the horizontal direction has been described, but when GA and BA are input in the second line in the horizontal direction (see FIG. 4), the same process is carried out although the values of coefficients K1 and K2 are changed.

The delay line 107 outputs the A image luminance signal, which is output from the A image luminance signal generation unit 106, to the B image luminance signal calculation unit 108 in accordance with the input timing of the A+B image signal 119, which is an imaging pixel signal from the signal separation unit 104 to the B image luminance signal calculation unit 108. The signal output from the delay line 107 will hereafter be referred to as "the YA component signal 120".

The B image luminance signal calculation unit 108 and a B image signal estimation unit 109 are characteristic component elements of the focus detection apparatus according to the present embodiment, and based on the YA component signal 120 received from the delay line 107 and the A+B image signal 119 received from the signal separation unit 104, a B image pixel signal is estimated. Next, a detailed description will be given of the B image luminance signal calculation unit 108 and the B image signal estimation unit 109.

As shown in FIG. 1, based on the YA component signal 120 received from the delay line 107 and the A+B image signal 119 received from the signal separation unit 104, the B image luminance signal calculation unit 108 calculates and outputs a YB component signal 121 and an A+B image luminance component signal 122. It should be noted that the YB component signal 121 is a component signal of a luminance signal Y of a B image signal, and the A+B image luminance component signal 122 is a sum signal of a luminance component signal of an A image pixel and a luminance component signal of a B image pixel.

Referring now to a timing chart of FIG. 4, a description will be given of a method to calculate the YB component signal 121 in the image pickup apparatus 100. It should be noted that in FIG. 4, the first line and the second line in the horizontal direction are illustrated, but the same calculation process is carried out for the third line and the subsequent lines as well.

R(A+B), G(A+B), and B(A+B) designate sum pixel signals of an A image pixel and a B image signal for respective colors, red, green, and blue as with RA, GA, and BA. In an upper column of FIG. 4, the readout pixel signal 117 output from the A/D conversion unit 103 is illustrated. As described earlier, the solid-state imaging device 102 has the two split PDs 1a and 1b respectively corresponding to the A and B image pixels sharing the same micro lens 2, and each micro lens 2 has color filters having the Bayer pattern. Y(A+B)(R, G) which is a red-green component sum signal of luminance signals of the A and B image pixels, and Y(A+B)(G, B) which is a green and blue component sum signal of luminance signals of the A and B image pixels are used for computation of the YB component signal 121. Y(A+B)(R, G) is obtained from R(A+B) and G(A+B), and Y(A+B)(G, B) is obtained from G(A+B) and B(A+B).

Figure 4:
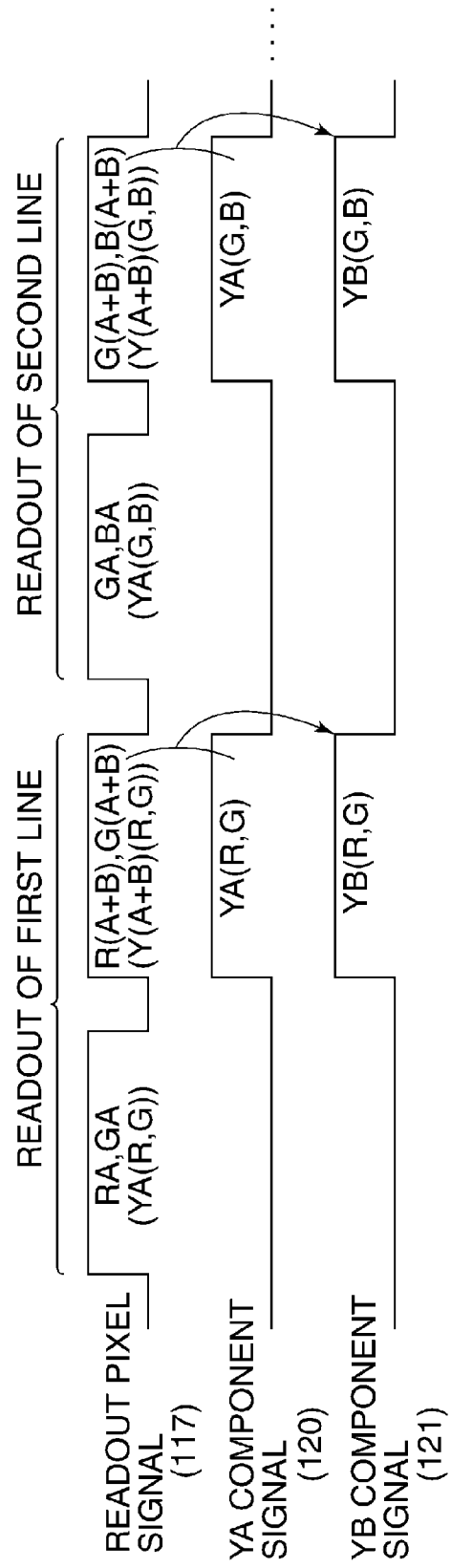
FIG. 4 is a timing chart showing a method to calculate a luminance component signal of a B image pixel in the image pickup apparatus appearing in FIG. 1.

The YA component signal 120 shown in a middle column of FIG. 4, which is a luminance signal of an A image pixel as described earlier with reference to FIG. 3, includes YA(R, G) which is a red-green component sum signal, and YA(G, B) which is a green-blue component sum signal. YA(R, G) is obtained from RA, GA (A image pixel signals of red and green), and YA(G, B) is obtained from GA, BA (A image pixel signals of green and blue).

The YB component signal 121, which is a luminance signal of a B image pixel, includes YB(R, G) which is a red-green component sum signal, and YB(G, B) which is a green-blue component sum signal. YB(R, G) is obtained by subtracting YA(R, G) from Y(A+B)(R, G), and YB(G, B) is obtained by subtracting YA(G, B) from Y(A+B)(G, B).

A concrete description will now be given of a process in which the YB component signal 121 is calculated. Specifically, RA and GA are read out through non-destructive readout of the first line in the horizontal direction of the solid-state imaging device 102. RA and GA thus read out are converted into a component signal of a luminance signal Y for use in focus detection to generate YA(R, G). When the non-destructive readout is completed, R(A+B) and G(A+B) are read out as sums of outputs from the split PDs 1a and 1b constituting the solid-state imaging device 102 and then Y(A+B)(R, G) is obtained as a result of sum of R(A+B) and G(A+B). At this time, to obtain YB(R, G) by performing a computation, YA(R, G) is subtracted from Y(A+B)(R, G) only after a one-line delay. Likewise, color filters are changed from R, G to G, B, and processing is performed for the second line in the horizontal direction.

Figure 5:
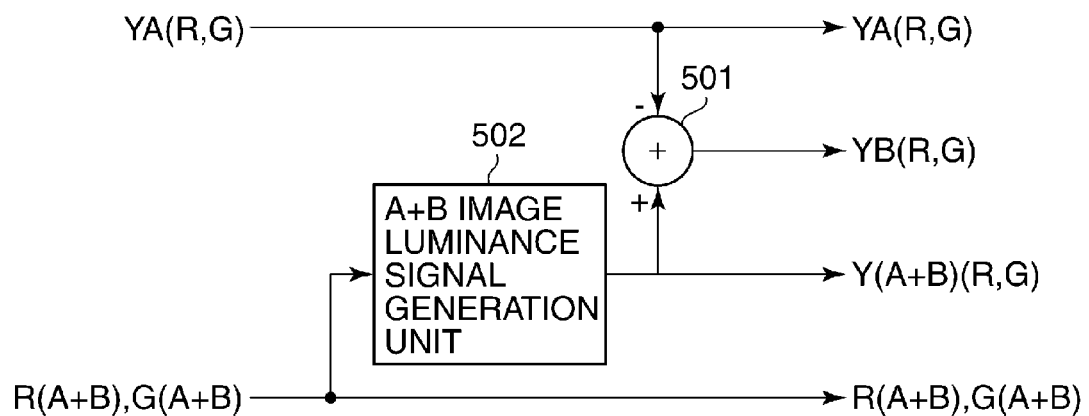
FIG. 5 is a diagram showing a circuit arrangement of a B image luminance signal calculation unit appearing in FIG. 1 and details of signal processing carried out by the B image luminance signal calculation unit.

Referring next to FIG. 5 showing a circuit arrangement of the B image luminance signal calculation unit 108, a description will be given of signal processing carried out by the B image luminance signal calculation unit 108. In the following description, it is assumed that RA and GA constituting the first line in the horizontal direction are input.

Input to the B image luminance signal calculation unit 108 are YA(R, G) of the YA component signal 120 output from the delay line 107, and R(A+B) and G(A+B) of the A+B image signal 119 output from the signal separation unit 104. YA(R, G) branches to a path in which it is directly output to a later stage, and a path in which it is input to an adding unit 501. R(A+B) and G(A+B) branch to a path in which they are directly output to a later stage, and a path in which they are input to an A+B image luminance signal generation unit 502.

The A+B image luminance signal generation unit 502 has the same circuit arrangement as that of the A image luminance signal generation unit 106 described earlier with reference to FIG. 3 and generates and outputs Y(A+B)(R, G) which is a luminance component signal of R(A+B) and G(A+B) that are successively input in the horizontal direction. Y(A+B)(R, G) output by the A+B image luminance signal generation unit 502 branches to a path in which it is directly output to the B image signal estimation unit 109 in a later stage, and a path in which it is input to the adding unit 501. The adding unit 501 calculates YB(R, G) which is part of the YB component signal 121 according to [Equation 1] below and outputs calculated YB(R, G) to the B image signal estimation unit 109 in a later stage.

$$YB(R,G)=Y(A+B)(R,G)-YA(R,G) \quad \text{[Equation 1]}$$

Thus, the A+B image luminance component signal 122 including Y(A+B)(R, G) generated by the A+B image luminance signal generation unit 502 and the YB component signal 121 including YB(R, G) calculated by the adding unit 501 are output to the B image signal estimation unit 109 in a later stage.

It should be noted that detailed description of a case where YB(G, B), G(A+B), and B(A+B) in the second line in the horizontal direction are input to the B image luminance signal calculation unit 108 is omitted, but in this case, Y(A+B)(G, B) and YB(G, B) are calculated in the same process as for the first line in the horizontal direction.

Figure 6:
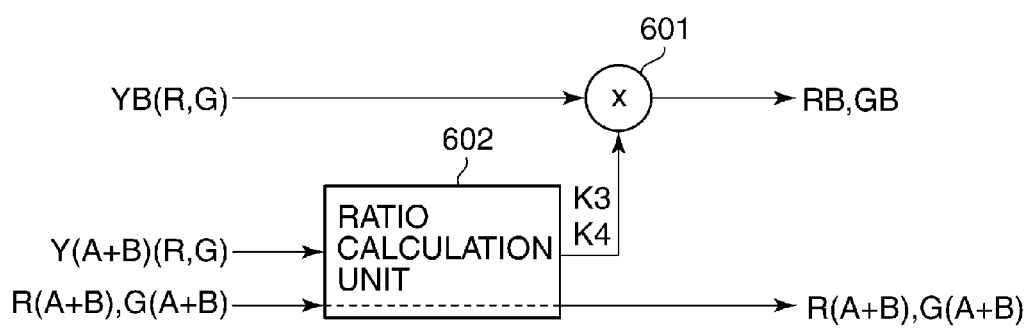
FIG. 6 is a diagram showing a circuit arrangement of a B image signal estimation unit appearing in FIG. 1 and details of signal processing carried out by the B image signal estimation unit.

The B image signal estimation unit 109 estimates a pixel value of a B image pixel by performing a predetermined computation. A description will now be given of signal processing carried out by the B image signal estimation unit 109 with reference to FIG. 6 showing a circuit arrangement of the B image signal estimation unit 109. It is assumed here that Y(A+B)(R, G) and YB(R, G) in the first line in the horizontal direction shown in FIG. 5 are input to the B image signal estimation unit 109.

Input to the B image signal estimation unit 109 are YB(R, G) of the YB component signal 121, Y(A+B)(R, G) of the A+B image luminance component signal 122, and R(A+B) and G(A+B) of the A+B image signal 119 which is an imaging signal. Y(A+B)(R, G), R(A+B), and G(A+B) are input to a ratio calculation unit 602. The ratio calculation unit 602 calculates a ratio K3 and a ratio K4 based on [Equation 2] and [Equation 3] below and outputs them.

$$K3=R(A+B)/Y(A+B)(R,G) \quad \text{[Equation 2]}$$

$$K4=G(A+B)/Y(A+B)(R,G) \quad \text{[Equation 3]}$$

The ratio K3 is a ratio of an R pixel signal to signal components of an R pixel (a pixel under a red color filter) and a G pixel (a pixel under a green color filter) constituting the A+B image luminance component signal 122. Likewise, the ratio K4 is a ratio of a G pixel signal to signal components of the R pixel and the G pixel constituting the A+B image luminance component signal 122.

The calculated ratios K3 and K4 are output to a multiplication unit 601, and YB(R, G) is multiplied by the ratios K3 and K4 according to [Equation 4] and [Equation 5] below, so that non-destructive readout pixels of a B image in a split PD, that is, RB and GB which are red and green B image pixel signals are estimated. A B image signal 123 including RB and GB calculated according to [Equation 4] and [Equation 5] is output to a B image saturation detection unit 110 which is a second saturation detection unit.

$$YB(R,G) \times K3 = RB \quad \text{[Equation 4]}$$

$$YB(R,G) \times K4 = GB \quad \text{[Equation 5]}$$

It should be noted that in the same manner, GB and BB which are green and blue B image pixel signals are estimated from YB(G, B) of the YB component signal 121, Y(A+B)(G, B) of the A+B image luminance component signal 122 and, G(A+B) and B(A+B) of the A+B image signal 119.

Figure 11A:
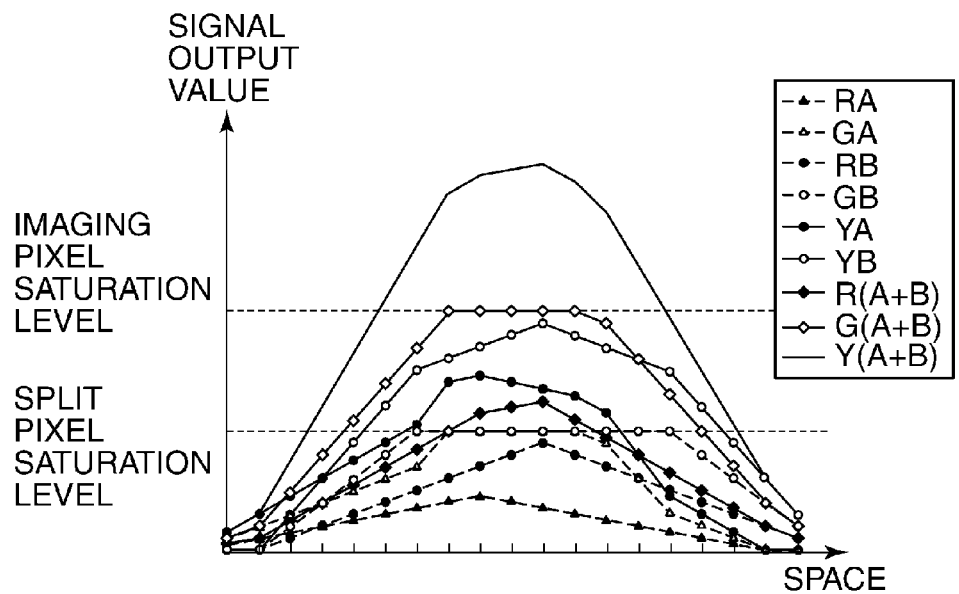
FIGS. 11A to 11C are first diagrams showing an example in which a B image signal is estimated by the B image signal estimation unit which the image pickup apparatus appearing in FIG. 1 has.

A description will now be given of an example in which the B image signal 123 is estimated with reference to FIGS. 11A to 11C and FIGS. 12A to 12D. In FIGS. 11A to 11C and FIGS. 12A to 12D, the horizontal axis represents spatial position, and the vertical axis represents signal output value. FIG. 11A is a graph showing original signal values of various signals in an area where there is the first line in the horizontal direction of the solid-state imaging device 102. Details of the various signals are as described in FIG. 11A.

Figure 11B:
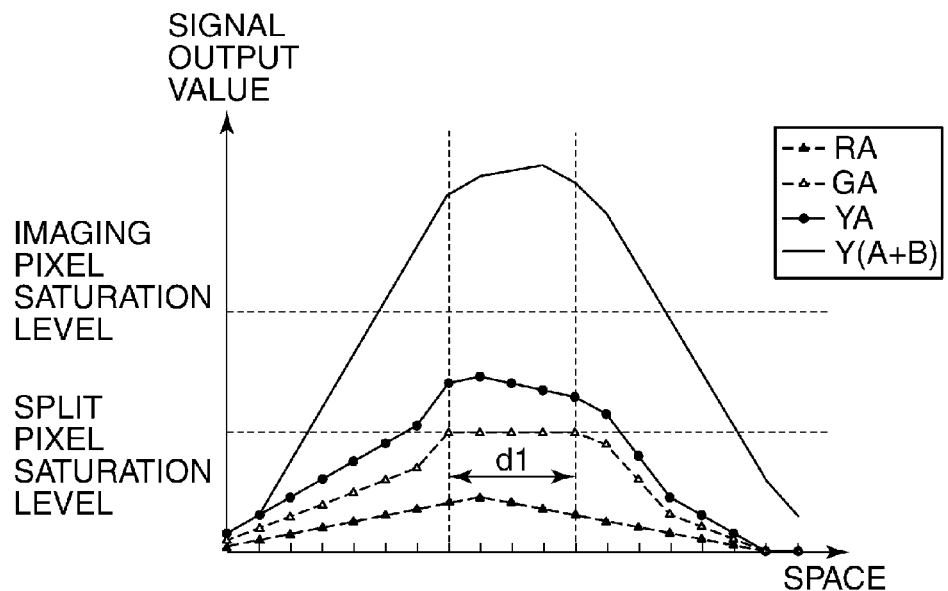
Figure 11C:
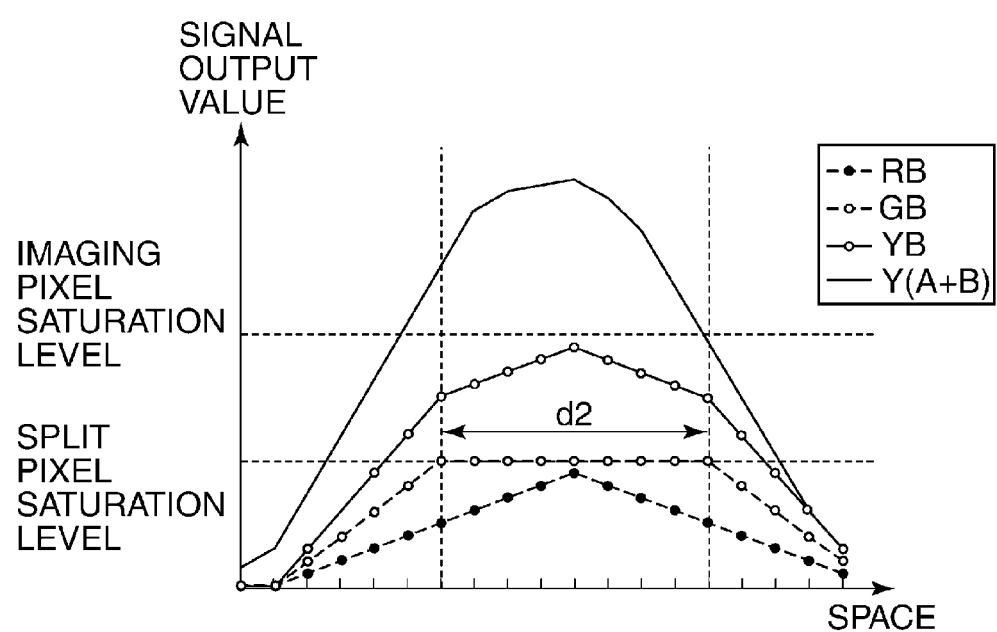

FIG. 11B is a graph showing signals which include A image components and are extracted from FIG. 11A, and "d1" indicates a section (saturated section) in which GA (green A image pixel signal) has reached a saturation level (charge accumulated in the split PD1*a* has saturated). FIG. 11C is a graph showing signals which include B image components and are extracted from FIG. 11A, and "d2" indicates a section (saturated section) in which GB (green B image pixel signal) has reached a saturation level (charge accumulated in the split PD1*b* has saturated).

Figure 12A:
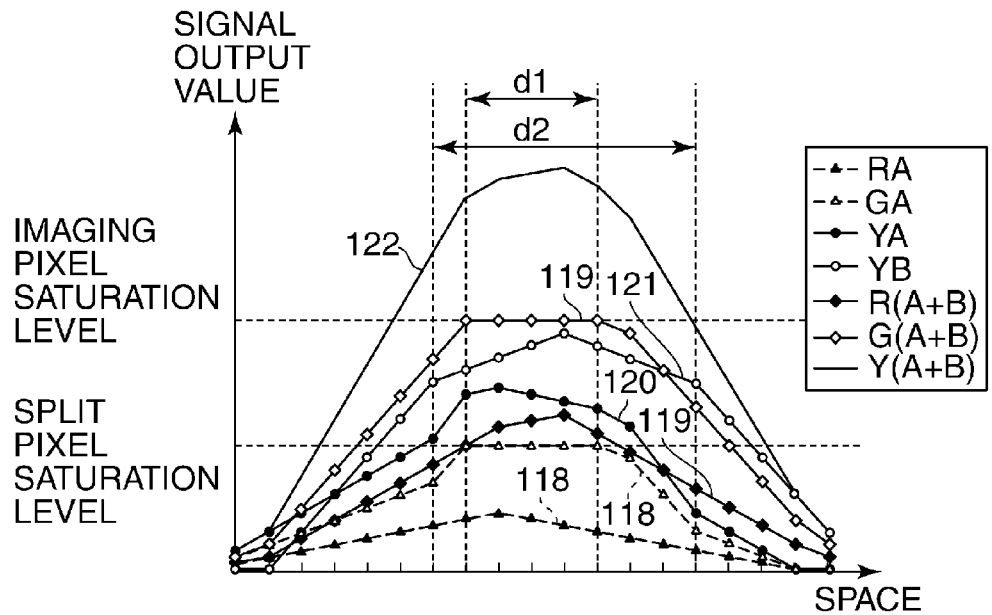
FIGS. 12A to 12D are second diagrams showing an example in which a B image signal is estimated by the B image signal estimation unit which the image pickup apparatus appearing in FIG. 1 has.

FIG. 12A is a graph in which signals that can be obtained according to the arrangement of the image pickup apparatus 100 and information on the saturated sections d1 and d2 are superposed on each other. According to the arrangement of the image pickup apparatus 100, the saturated section d1 of GA which is an A image pixel signal can be determined by the A image saturation detection unit 105. However, for a B image, the YB component signal 121 which is a luminance component signal is calculated, and hence RB and GB which are B image pixel signals cannot be obtained with respect to the saturated section d2 for GB which is a B image pixel signal. Also, because the YB component signal 121 has not reached an imaging pixel saturation level, saturation of RB and BG as well cannot be detected.

Figure 12B:
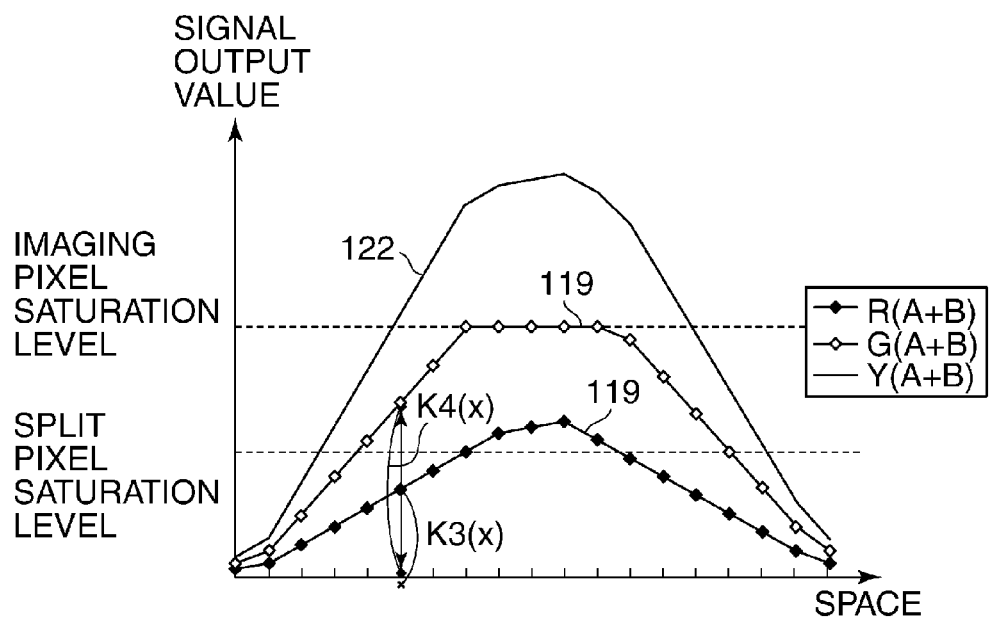

FIG. 12B is a graph showing Y(A+B), R(A+B), and G(A+B) extracted from FIG. 11A, and in which ratios of R(A+B) and G(A+B) to Y(A+B) at a given point x are designated by K3(*x*) and K4(*x*), respectively. It should be noted that K3(*x*) and K4(*x*) can be obtained using [Equation 2] and [Equation 3], respectively, described above.

Figure 12C:
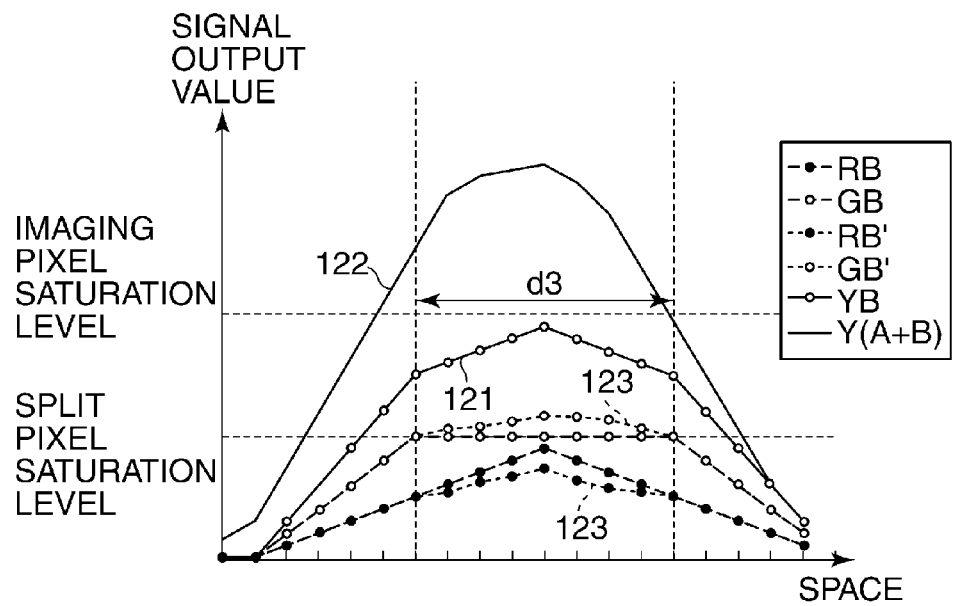

FIG. 12C is a graph in which estimation signals RB' and GB' from the split PD1*b* for a B image, which are calculated using [Equation 4] and [Equation 5], respectively, described above, are plotted. In FIG. 12C, "d3" indicates a section (saturated section) in which RB' or GB' has reached a split pixel saturation level. The saturated section d3 can be detected by applying a saturation level of the split PD1*b* to a threshold value of the B image saturation detection unit 110, to be described later.

Figure 12D:
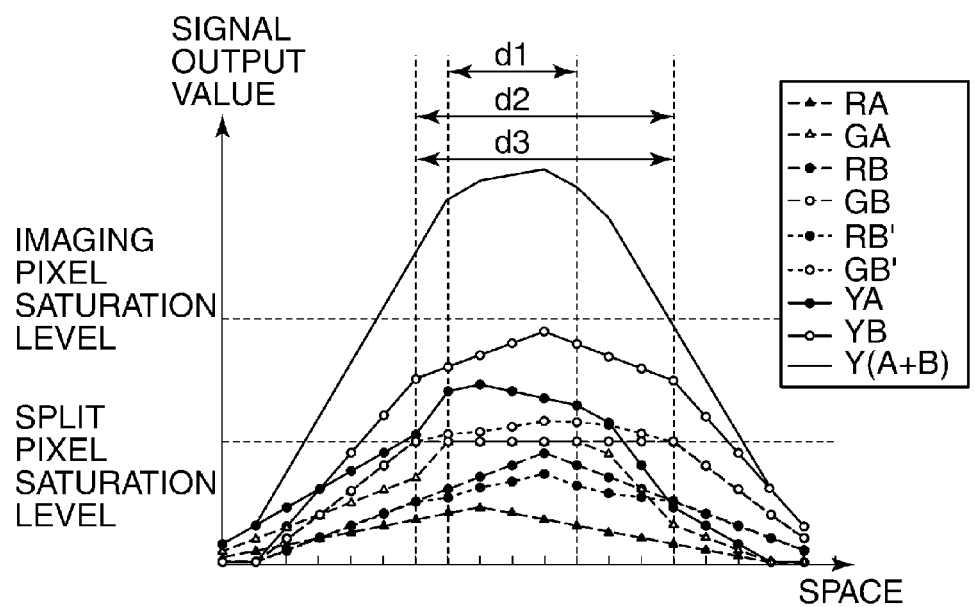

FIG. 12D is a graph in which the various signals and the saturated sections appearing in FIGS. 11A to 11C and FIG. 12A to 12D are superposed on each other. The saturated section d3 is the same section as the saturated section d2 of the original GB signal, and this means that satisfactory saturation detection results can be obtained.

The B image signal 123 calculated by the B image signal estimation unit 109 is input to the B image saturation detection unit 110. The B image saturation detection unit 110 determines whether or not the received B image signal 123 has reached a predetermined saturation level determined in advance. When the received B image signal 123 has reached the saturation level, the B image saturation detection unit 110 determines that this is a saturated pixel, adds 1 as a saturation bit to the MSB or LSB of a pixel signal, and then outputs the resulting pixel signal to the B image luminance signal generation unit 111 which is a second luminance signal generation unit. It should be noted that handling a part of a pixel signal as a saturation bit may replace addition of a saturation bit, and also, the polarity is not limitative.

The B image luminance signal generation unit 111 converts the signal received from the B image saturation detection unit 110 into a YB component signal 124 which is a luminance component signal of a B image pixel. It should be noted that a circuit arrangement of the B image luminance signal generation unit 111 and details of processing carried out by the B image luminance signal generation unit 111 are the same as the circuit arrangement of the A image luminance signal generation unit 106 and the details of processing carried out by the A image luminance signal generation unit 106 described above with reference to FIG. 3, and therefore, detailed description thereof is omitted here.

The YA component signal 120 which is output through the B image luminance signal calculation unit 108 and the YB component signal which output from the B image luminance signal generation unit 111 are input to the focus detection processing unit 112. The focus detection processing unit 112 obtains the amount of defocus from luminance signals of an A image and a B image consisting of an A image pixel and B image pixel corresponding to the split PDs 1a and 1b sharing one micro lens 2 and outputs the obtained amount of defocus to the CPU 115 (see FIG. 1).

Figure 7A:
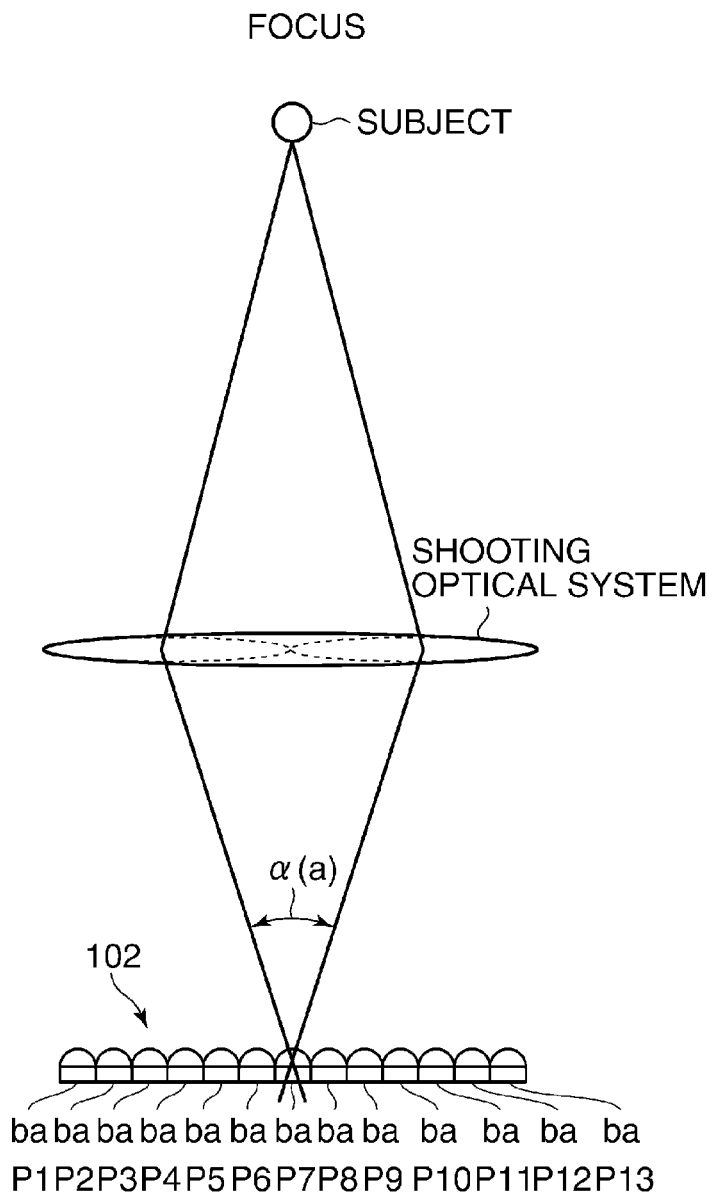
FIGS. 7A to 7C are diagrams schematically showing a focusing operation using pixel values of split PDs appearing in FIG. 2.
Figure 7B:
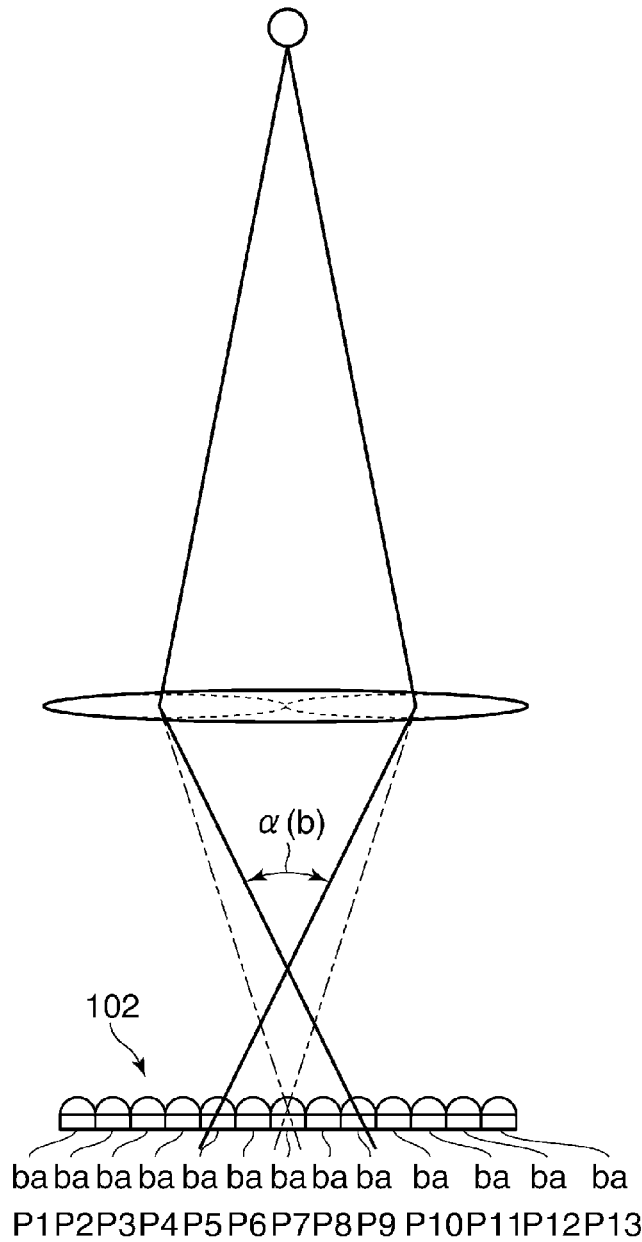
Figure 7C:
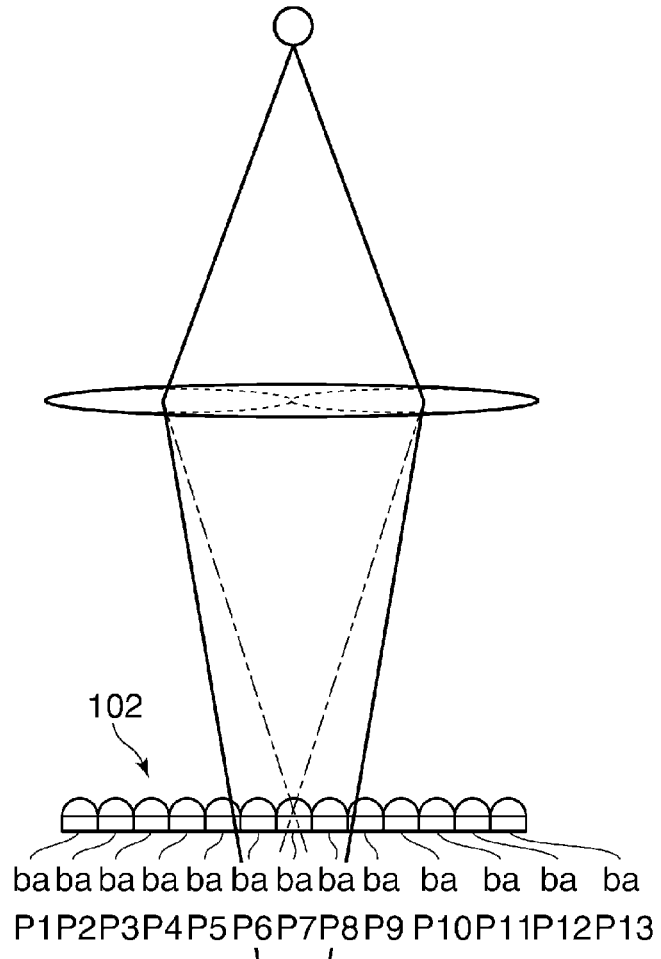
Figure 7C:
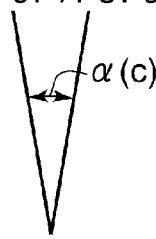
Figure 7C:
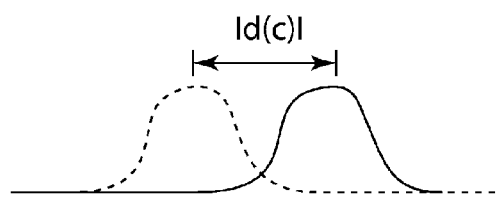

Referring now to FIGS. 7A to 7C, a description will be given of an exemplary distance measurement information obtaining operation using an A image and a B image. FIGS. 7A to 7C are views schematically showing a focusing operation using pixel values of the split PDs 1a and 1b. The solid-state imaging device 102 is comprised of an array of a plurality of unit pixel cells P, and an arrangement of each unit pixel cells P is as described above with reference to FIG. 2. Namely, each of the unit pixel cells P (13 cells P1 to P13 are shown in FIGS. 7A to 7C) is comprised of split pixels a and b corresponding to the split PDs 1a and 1b sharing one micro lens. A pair of split pixels a and b are pixels obtained through pupil-dividing using a micro lens as an exit pupil as is well known.

For distance measurement, A pixel outputs and B pixel outputs from pixels a and b are combined together in a column direction (or a row direction) to generate A images and B images as outputs from unit pixel cells of the same color, and they are obtained as data. The amount of shift C between the corresponding points is obtained through correlation computations using [Equation 6] below.

$$C = \Sigma |YAn - YBn|$$ [Equation 6]

Here, (n) represents the number of micro lenses arranged in the horizontal direction. Values obtained when corresponding pixels are shifted relative to YBn are plotted, and a focusing position is obtained when the smallest amount of shift C is obtained.

FIG. 7A shows a focusing state in which light pencils from a subject image converge at an angle of α(a), and the image pickup optical system forms an image on split PDs sharing a micro lens in the unit pixel cell P7, so that an A image pixel group and a B image pixel group substantially correspond to each other. At this time, the amount of image shift d(a) between the A image pixel group and the B image pixel group obtained through correlation computations is substantially zero (0).

FIG. 7B shows a state in which light pencils from a subject image converge at an angle of α(b), which is greater than the angle of α(a), and hence a focal point is behind a subject (so-called rear focus). At this time, the image pickup optical system forms an image, for example, on split pixels of the unit pixel cell P5 for A image pixels and split pixels of the unit pixel cell P9 for B image pixels. In this case, there is an image shift of d(b) between the A image pixel group and the B image pixel group obtained through correlation computations.

FIG. 7C shows a state in which light pencils from a subject image converge at an angle of α(c), which is smaller than the angle of α(a), and hence a focal point is in front of a subject (so-called front focus). At this time, the image pickup optical system forms an image, for example, on split pixels of the unit pixel cell P9 for A image pixels and split pixels of the unit pixel cell P5 for B image pixels. In this case, there is an image shift in a direction opposite to the direction of image shift in the case of rear focus shown in FIG. 7B, and an absolute value of the amount of image shift d(c) between the A image pixel group and the B image pixel group obtained through correlation computations is substantially equal to an absolute value of the amount of image shift d(b) in the case of rear focus. Namely, an A image pixel group and a B image pixels see the same subject in the focusing state, but in the state of rear focus and the state of front focus, they see subjects shifted by certain amounts of image shift.

Therefore, to actually perform a focusing operation for the image pickup optical system, the amount of defocus is obtained using a well known technique based on obtained amounts of image shift and base-line length, and the image pickup system is driven accordingly to focus on a subject. It should be noted that at the time of performing well-known correlation computations, for example, a method in which a value calculated by a pixel value in which a saturation bit is set is not for use in obtaining the amount of focusing, and a method in which a weight is assigned so as to decrease reliability can be used, but the present invention is not limited to these methods.

Based on the amount of defocus output from the focus detection processing unit 112, the CPU 115 obtains drive information on a focusing lens included in the optical unit 101, and as shown in FIG. 1, outputs the drive information to the drive control unit 116. It should be noted that the CPU 115 controls the overall system of the image pickup apparatus 100. Based on a control signal output from the CPU 115, the drive control unit 116 outputs drive information on a focusing lens, a shutter, and so on included in the optical unit 101. The drive information is the amount of movement based on the amount of defocus calculated by the focus detection processing unit 112.

As shown in FIG. 1, the image processing unit 113 carries out predetermined digital signal processing on the A+B image signal 119, which is an imaging signal input from the B image signal estimation unit 109, and outputs the resulting signal to a display unit 114 via a DRAM (not shown). It should be noted that examples of the predetermined digital processing include defective pixel correction, AE (auto exposure), AF (auto focus), white balance adjustment, gamma adjustment, noise reduction processing, and synchronization processing. The display unit 114 displays image data (an image being taken), which is created by the image processing unit 113, on a liquid crystal panel or the like via a DRAM (not shown).

Figure 8:
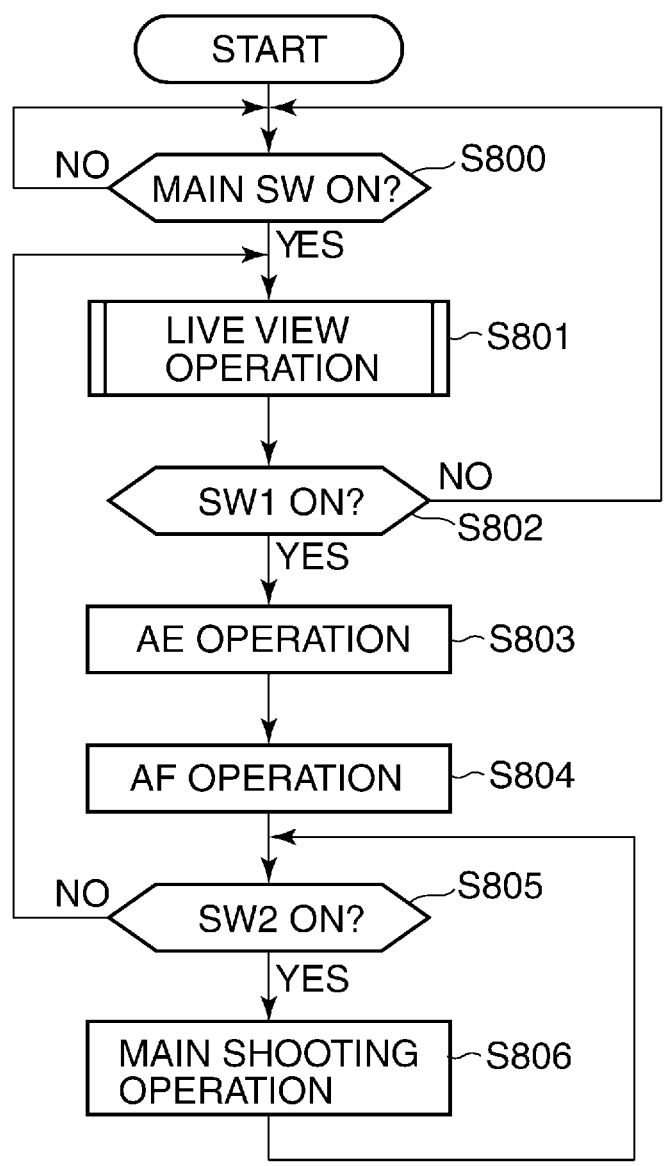
FIG. 8 is a flowchart showing how a CPU controls the overall system when the image pickup apparatus appearing in FIG. 1 carries out a shooting operation.

Referring next to a flowchart of FIG. 8, a description will be given of how the CPU 115 controls the entire system when the image pickup apparatus 100 is performing a shooting operation. First, the CPU 115 detects a state of a main switch (SW), not shown, which is for turning on the power to the system (step S800). When the main SW is on (YES in the step S800), the CPU 115 proceeds to a process in S801, and when the main SW is off (NO in the step S800), the CPU 115 stands by in the step S800.

In the step S801, the CPU 115 performs a live view operation, and after that, detects a state of a switch SW1 which is a switch in a first stage of a release switch (step S802). It should be noted that the switch SW1 is a switch for so-called focusing on a subject. Details of the live view operation will be described later with reference to FIG. 9.

When the switch SW1 is on (YES in the step S802), the CPU 115 proceeds to a process in step S803 so as to perform a shooting standby operation before main shooting, and when the switch SW1 is off (NO in the step S802), the CPU 115 returns to the process in the step S800.

In the step S803, the CPU 115 determines exposure conditions according to an exposure correction value set in advance by an exposure setting unit (not shown) based on image information obtained by the live view operation, and outputs an aperture value and a shutter speed (exposure time) to the drive control unit 116. Then, the CPU 115 focuses on a subject (AF operation) by shifting a position of the focusing lens of the drive control unit 116 based on the amount of defocus obtained by the live view operation (step S804). Thereafter, the CPU 115 detects a state of a switch SW2 which is a switch in a second stage of the release switch (step S805). It should be noted that the switch SW2 is a switch for performing a shooting operation by driving a shutter or the like.

When the switch SW2 is on (YES in the step S805), the CPU 115 proceeds to a process in step S806 so as to perform main shooting, and when the switch SW2 is off (NO in the step S805), the CPU 115 returns to the process in the step S801. In the step S806, the CPU 115 performs a main shooting operation by controlling the overall system of the image pickup apparatus 100, and thereafter, returns to the process in the step S805.

It should be noted that in the main shooting operation, first, a charge clearing operation and a charge accumulation starting operation for the solid-state imaging device 102 are performed, and based on the exposure conditions determined in the step S803, the optical unit 101 is controlled via the drive control unit 116 to open the shutter. Then, light exposure to a main shooting image by the solid-state imaging device 102 is started, and light exposure is performed at the shutter speed determined in the step S803. When the shutter is closed to complete charge accumulation in the solid-state imaging device 102, a sum of charge is read out from split PDs. The charge read out from the solid-state imaging device 102 is output to a memory card (not shown) typified by an SD card or the like via the A/D conversion unit 103, the signal separation unit 104, and the image processing unit 113.

Figure 9:
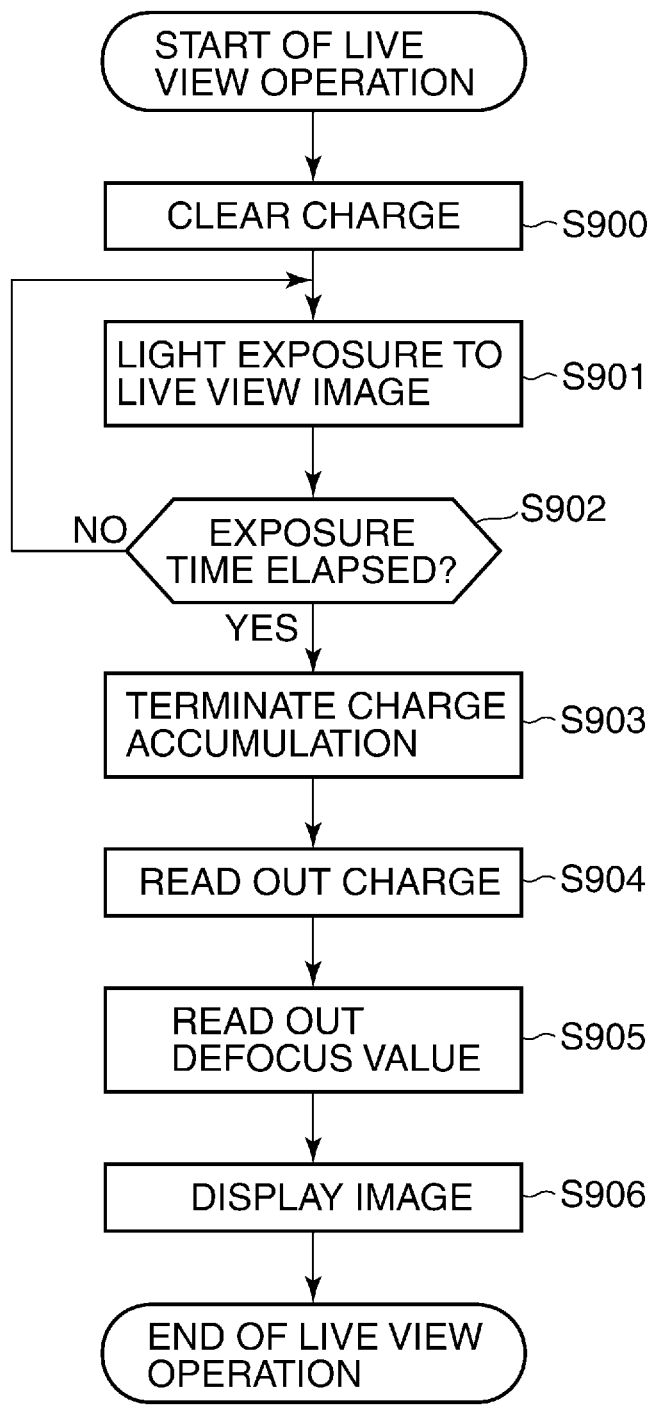
FIG. 9 is a flowchart of a live view operation carried out in step S801 appearing in FIG. 8.

Referring next to a flowchart of FIG. 9, a description will be given of the live view operation in the step S801. In the live view operation, first, the CPU 115 provides charge clearing control for the solid-state imaging device 102 (step S900), and thereafter, starts charge accumulation by providing live view image exposure control for the solid-state imaging device 102 (step S901). Then, the CPU 115 determines whether or not a set exposure time has elapsed (step S902), and when the exposure time has not elapsed (NO in the step S902), the CPU 115 returns to the process in the step S901 in which it performs exposures.

When the exposure time has elapsed (YES in the step S902), the CPU 115 carries out a charge accumulation termination process using an electric shutter for the solid-state imaging device 102 (step S903). After completion of the step S903, the CPU 115 reads out charge from the solid-state imaging device 102 and performs predetermined signal processing so as to execute signal processing described earlier with reference to FIGS. 1 and 3 to 6 (step S904). Then, the CPU 115 reads out the amount of defocus calculated by a focus detection processing unit 112 in the step S904 (step S905), and based on output from the image processing unit 113, outputs an image for live view to the display unit 114 such as a liquid crystal panel (step S906).

As described above, according to the present embodiment, the amount of defocus is obtained by detecting saturation with respect to each split PD using pixel values obtained through computations. This enables focus detection with consideration given to collapsing of a phase-contrast image.

In the first embodiment described above, a B image pixel signal of a split PD is estimated based on the ratio of each color component to Y(A+B) which is a sum of luminance signals of A and B image pixels. On the other hand, in the second embodiment, a B image pixel signal output from a split PD is estimated based on the content ratio of an A image signal and a B image signal to Y(A+B). It should be noted that a description will be given below only of a B image signal estimation unit which is a point of difference from the first embodiment, and description of duplicate parts is omitted.

Figure 10:
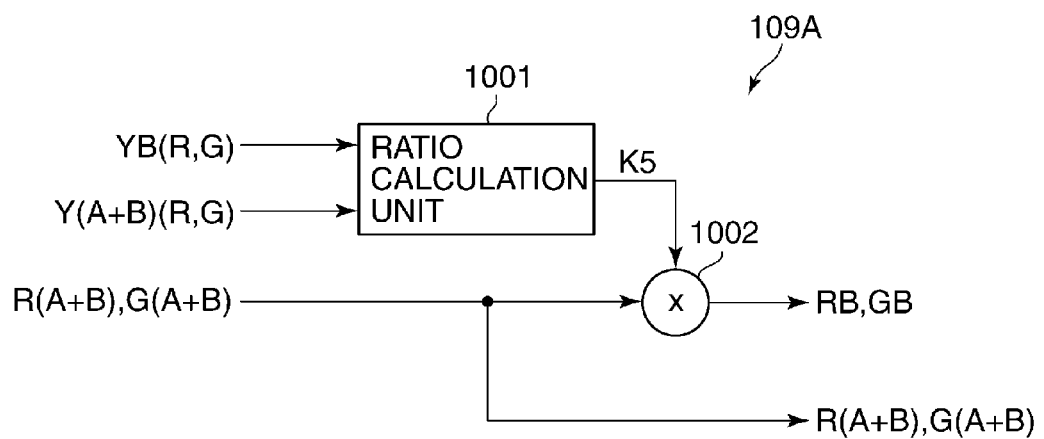
FIG. 10 is a diagram showing a circuit arrangement of a variation of the B image signal estimation unit which the image pickup apparatus appearing in FIG. 1 has and details of signal processing carried out by the variation of the B image signal estimation unit.

FIG. 10 is a diagram showing a circuit arrangement of a B image signal estimation unit 109A and details of signal processing performed by the B image signal estimation unit 109A. It is assumed here that Y(A+B)(R, G) and YB(R, G) in the first line in the horizontal direction are input to the B image signal estimation unit 109A. YB(R, G) which is a sum signal of red and green component signals in a luminance signal of a B image, Y(A+B)(R, G) which is a sum signal of red and green component signals in luminance signals of A and B image pixels, and R(A+B) and G(A+B) which are sum pixel signals for imaging in red and green of A and B image pixels are input to the B image signal estimation unit 109A.

YB(R, G) and Y(A+B)(R, G) are input to a ratio calculation unit 1001, which in turn obtains a ratio K5 of YB(R, G) to Y(A+B)(R, G) according to [Equation 7] below and outputs the ratio K5 to a multiplication unit 1002.

$$K5 = YB(R,G)/Y(A+B)(R,G) \qquad \text{[Equation 7]}$$

According to [Equation 8] and [Equation 9] below, the multiplication unit 1002 multiplies each of R(A+B) and G(A+B) by the ratio K5 to estimate and output RB and GB.

$$RB = R(A+B) \times K5 \qquad \text{[Equation 8]}$$

$$GB = G(A+B) \times K5 \qquad \text{[Equation 9]}$$

RB and GB estimated using [Equation 7] and [Equation 8] are output to a B image saturation detection unit 110 in a later stage, and the same process as that in the first embodiment is carried out. Thus, in the second embodiment as well, the same effects as those in the first embodiment can be obtained.

In the embodiments described above, saturation of a B image pixel signal is detected in the case where the number of split PDs sharing one micro lens 2 is two (split PDs 1a and 1b). However, the number of split PDs sharing one micro lens is not limitative, but even when the number of split PDs sharing one micro lens is three or more, the same processing can be performed. Moreover, the computation method used in the embodiments described above is only illustrative, but for example, when the solid-state imaging device 102 has a different arrangement, the computation method is changed according to the arrangement, and the same processing can be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105990 filed May 7, 2012, which is hereby incorporated by reference herein in its entirety.

What is claimed is:

1. A focus detection apparatus comprising:
a solid-state imaging device configured to have an array of a plurality of unit pixel cells each having a plurality of photoelectric converters sharing one micro lens;
a first saturation detection unit configured to, with respect to each of the unit pixel cells, detect saturation of a pixel signal read out from one of the plurality of photoelectric converters;
a first luminance signal generation unit configured to generate a first luminance signal from the pixel signal;
an estimation unit configured to, based on the first luminance signal and a sum pixel signal obtained from the unit pixel cell having the plurality of photoelectric converters, estimate another pixel signal output from another one of the plurality of photoelectric converters;
a second saturation detection unit configured to detect saturation of the another pixel signal estimated by said estimation unit;
a second luminance signal generation unit configured to generate a second luminance signal from a the another pixel signal; and
a focus detection processing unit configured to, based on the first luminance signal and the second luminance signal, calculate an amount of defocus for an optical system provided for the solid-state imaging device.

2. A focus detection apparatus according to claim 1, wherein said estimation unit comprises:
a luminance signal calculation unit that generates a luminance signal of the sum pixel signal, and based on the first luminance signal and the luminance signal of the sum pixel signal, calculates a luminance signal of the another pixel signal output from the other photoelectric converter; and
a signal estimation unit that calculates, based on the sum pixel signal, the luminance signal of the sum pixel signal, and the luminance signal of the another pixel signal output from the other photoelectric converter calculated by the luminance signal calculation unit, the another pixel signal output from the other photoelectric converter.

3. A focus detection apparatus according to claim 2, wherein by subtracting the first luminance signal from the luminance signal of the sum pixel signal, the luminance signal calculation unit calculates the luminance signal of the another pixel signal output from the other photoelectric converter.

4. A focus detection apparatus according to claim 2, wherein the signal estimation unit calculates a ratio of the sum pixel signal to the luminance signal of the sum pixel signal, and multiplies the luminance signal of the another pixel signal, which is output from the other photoelectric converter, by the ratio to calculate the another pixel signal output from the other photoelectric converter.

5. A focus detection apparatus according to claim 2, wherein the signal estimation unit calculates a ratio of the luminance signal of the another pixel signal, which is output from the other photoelectric converter, to the luminance signal of the sum pixel signal, and multiplies the sum pixel signal by the ratio to calculate the another pixel signal output from the other photoelectric converter.

6. A focus detection apparatus according to claim 1, further comprising a delay unit configured to delay the first luminance signal so as to synchronize timing with which the first luminance signal is input to said estimation unit with timing with which the sum pixel signal is input to the estimation unit.

7. An image pickup apparatus comprising:
a focus detection apparatus configured to have a solid-state imaging device configured to have an array of a plurality of unit pixel cells each having a plurality of photoelectric converters sharing one micro lens, a first saturation detection unit configured to, with respect to each of the unit pixel cells, detect saturation of a pixel signal read out from one of the plurality of photoelectric converters, a first luminance signal generation unit configured to generate a first luminance signal from the pixel signal, an estimation unit configured to, based on the first luminance signal and a sum pixel signal obtained from the unit pixel cell having plurality of photoelectric converters, estimate another pixel signal output from another one of the plurality of photoelectric converters, a second saturation detection unit configured to detect saturation of the another pixel signal estimated by the estimation unit, a second luminance signal generation unit configured to generate a second luminance signal from the another pixel signal, and a focus detection processing unit configured to, based on the first luminance signal and the second luminance signal, calculate an amount of defocus for an optical system provided for the solid-state imaging device;
a group of lenses configured to form an optical image on the solid-state imaging device which the focus detection apparatus has; and
a control unit configured to drivingly control said group of lenses based on the amount of defocus output from the focus detection processing unit which the focus detection apparatus has.

8. A focus detection apparatus according to claim 1, wherein the first saturation detection unit detects saturation of a pixel signal read out in a non-destructive manner from one of the plurality of photoelectric converters.

9. A focus detection apparatus according to claim 1, wherein the first luminance signal generation unit generates the first luminance signal from a first output signal from the first saturation detection unit, and
the second luminance signal generation unit generates the second luminance signal from a second output signal from the second saturation detection unit.

10. A focus detection apparatus comprising:
a solid-state imaging device configured to have an array of a plurality of unit pixel cells each having a plurality of photoelectric converters sharing one micro lens;
a first saturation detection unit configured to, with respect to each of the unit pixel cells, detect saturation of a pixel signal read out from one of the plurality of photoelectric converters;
a first mixed signal generation unit configured to generate a first mixed signal from a first output signal from the pixel signal;
an estimation unit configured to, based on the first mixed signal and a sum pixel signal obtained from the unit pixel cell having the plurality of photoelectric converters, estimate another pixel signal output from another one of the plurality of photoelectric converters;
a second saturation detection unit configured to detect saturation of the another pixel signal estimated by said estimation unit;
a second mixed signal generation unit configured to generate a second mixed signal from the another pixel signal; and
a focus detection processing unit configured to, based on the first mixed signal and the second mixed signal, calculate an amount of defocus for an optical system provided for the solid-state imaging device.

11. A focus detection method comprising:
detecting, by a circuit, with respect to each of unit pixel cells, saturation of a pixel signal read out from a solid-state imaging device, wherein the solid-state imaging device is configured to have an array of a plurality of unit pixel cells each having a plurality of photoelectric converters sharing one micro lens;
generating, by a circuit, a first luminance signal from the pixel signal;
estimating, by a circuit, based on the first luminance signal and a sum pixel signal obtained from the unit pixel cell having the plurality of photoelectric converters, another pixel signal output from another one of the plurality of photoelectric converters;
detecting, by a circuit, saturation of the estimated another pixel signal;
generating, by a circuit, a second luminance signal from the another pixel signal; and
calculating, by a circuit, based on the first luminance signal and the second luminance signal, an amount of defocus for an optical system provided for the solid-state imaging device.

12. A focus detection method comprising:
detecting, by a circuit, with respect to each of unit pixel cells, saturation of a pixel signal read out from a solid-state imaging device, wherein the solid-state imaging device is configured to have an array of a plurality of unit pixel cells each having a plurality of photoelectric converters sharing one micro lens;
generating, by a circuit, a first mixed signal from the pixel signal;
estimating, by a circuit, based on the first mixed signal and a sum pixel signal obtained from the unit pixel cell having the plurality of photoelectric converters, another pixel signal output from another one of the plurality of photoelectric converters;
detecting, by a circuit, saturation of the estimated another pixel signal;
generating, by a circuit, a second mixed signal from the another pixel signal; and
calculating, by a circuit, based on the first mixed signal and the second mixed signal, an amount of defocus for an optical system provided for the solid-state imaging device.

* * * * *